US011858823B2

(12) United States Patent
Bassani et al.

(10) Patent No.: US 11,858,823 B2
(45) Date of Patent: *Jan. 2, 2024

(54) PROCESS TO RECOVER AMMONIUM BICARBONATE FROM WASTEWATER

(71) Applicant: BION ENVIRONMENTAL TECHNOLOGIES, INC., Old Bethpage, NY (US)

(72) Inventors: Dominic Bassani, Dix Hills, NY (US); Morton Orentlicher, New York, NY (US); Mark M. Simon, Wilbraham, MA (US); Stephen Pagano, Pine Level, NC (US)

(73) Assignee: BION ENVIRONMENTAL TECHNOLOGIES, INC., Old Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/589,037

(22) Filed: Jan. 31, 2022

(65) Prior Publication Data

US 2022/0227637 A1 Jul. 21, 2022

Related U.S. Application Data

(63) Continuation of application No. 16/790,390, filed on Feb. 13, 2020, now Pat. No. 11,254,581, which is a (Continued)

(51) Int. Cl.
*C01C 1/26* (2006.01)
*C02F 9/00* (2023.01)
(Continued)

(52) U.S. Cl.
CPC .............. *C01C 1/26* (2013.01); *B01D 9/00* (2013.01); *C02F 9/00* (2013.01); *C05C 11/00* (2013.01);
(Continued)

(58) Field of Classification Search
CPC .. C02F 1/20; C02F 1/441; C02F 1/444; C02F 3/28; C02F 11/04; C02F 2101/15; C01C 1/26
See application file for complete search history.

(56) References Cited

U.S. PATENT DOCUMENTS 3,985,859 A 10/1976 Blaine et al.
6,368,849 B1 4/2002 Norddahl et al.
(Continued)

FOREIGN PATENT DOCUMENTS

WO WO 2016/115255 7/2016

OTHER PUBLICATIONS

Carrio et al., "Ammonia-Nitrogen Removal from Centrate—10 Years of Testing and Operating Experience in New York City," New York City Department of Environmental Protection, 2003, 14 pages.
(Continued)

*Primary Examiner* — Richard M Rump
(74) *Attorney, Agent, or Firm* — Hoxie & Associates LLC

(57) ABSTRACT

The present invention is a process, a method, and system for recovery and concentration of dissolved ammonium bicarbonate from a wastewater containing ammonia ($NH_3$) using gas separation, condensation, and crystallization, each at controlled operating temperatures. The present invention includes 1) removal of ammonia from waste (sludges, semi-solids, and solids and liquids) without the use of chemicals at a temperature of at least 80 degrees Celsius, 2) condensing the gaseous containing ammonia, carbon dioxide and water vapor to remove water vapor concentrating the amount of gaseous ammonia and carbon dioxide, 3) concentrating the ammonia and carbon dioxide in the water by established means, such as concentrating the gas using partial condensation followed by passing the concentrated gas through an absorption column at a temperature of between about 20 and
(Continued)

50 degrees Celsius to form dissolved ammonium carbonate and ammonium bicarbonate, or total condensation followed by dewatering using reverse osmosis, and 4) crystallizing concentrated dissolved ammonium carbonate and ammonium bicarbonate at a temperature of less than about 35 degrees Celsius to form solid ammonium bicarbonate and ammonium carbonate.

25 Claims, 5 Drawing Sheets

Related U.S. Application Data continuation of application No. 15/638,193, filed on Jun. 29, 2017, now Pat. No. 10,604,432, which is a continuation-in-part of application No. 14/852,836, filed on Sep. 14, 2015, now Pat. No. 10,106,447.

(60) Provisional application No. 62/133,549, filed on Mar. 16, 2015, provisional application No. 62/103,191, filed on Jan. 14, 2015.

(51) Int. Cl.
*B01D 9/00* (2006.01)
*C05C 11/00* (2006.01)
*C02F 1/44* (2023.01)
*C02F 103/20* (2006.01)
*C02F 3/28* (2023.01)
*C02F 1/02* (2023.01)
*C02F 1/22* (2023.01)
*C02F 101/16* (2006.01)
*C02F 1/20* (2023.01)
*C02F 1/52* (2023.01)

(52) U.S. Cl.
CPC .... *B01D 9/0004* (2013.01); *B01D 2009/0086* (2013.01); *C02F 1/02* (2013.01); *C02F 1/20* (2013.01); *C02F 1/22* (2013.01); *C02F 1/441* (2013.01); *C02F 1/444* (2013.01); *C02F 1/447* (2013.01); *C02F 3/28* (2013.01); *C02F 2001/5218* (2013.01); *C02F 2101/16* (2013.01); *C02F 2103/20* (2013.01); *C02F 2209/02* (2013.01); *C02F 2303/24* (2013.01)

(56) References Cited

U.S. PATENT DOCUMENTS

| | | |
|---|---|---|
| 7,014,768 B2 | 3/2006 | Li et al. |
| 7,811,455 B2 | 10/2010 | Burke et al. |
| 8,398,855 B1 | 3/2013 | Pedros et al. |
| 8,637,304 B1 | 1/2014 | Burke et al. |
| 9,005,333 B1 | 4/2015 | Vanotti et al. |
| 10,106,447 B2 | 10/2018 | Orentlicher et al. |
| 10,604,432 B2 | 3/2020 | Bassani et al. |
| 2004/0199013 A1 | 10/2004 | Lardinois et al. |
| 2012/0315209 A1 | 12/2012 | Bisson et al. |
| 2014/0363344 A1 | 12/2014 | Orentlicher et al. |
| 2016/0200613 A1 | 7/2016 | Orentlicher et al. |
| 2019/0210904 A1 | 7/2019 | Orentlicher et al. |

OTHER PUBLICATIONS

De la Rubia et al., "Preliminary Trials of in situ ammonia stripping from source segregated domestic food waste digestate using biogas: Effect of temperature and flow rate," Bioresource technology, 2010, vol. 101, p. 9486-9492.

International Search Report of International Application No. PCT/US2016/013254, prepared by the International Search Authority, dated Mar. 28, 2016, 2 pages.

Jackson et al., "$CO_2$ Capture in Aqueous Ammonia Solutions: A Computational Chemistry Perspective," Physc. Chem. Chem. Phys, 2012, vol. 14, 16301-16311.

McCutcheon et al., "A novel Ammonia-Carbon Dioxide Forward (direct) Osmosis Desalination Process," Desalination, 2005, vol. 174, p. 1-11.

Niu et al., "Experimental Studies and Rate-Based Process Simulations of $CO2$ Absorption with Aqueous Ammonia Solutions," Industrial & Engineering Chemistry Research, 2012, vol. 51, p. 5309-5319.

Orentlicher et al., "Centrate Ammonia Reduction with ARP: Pilot Data with Synthetic and Actual Wastewaters," Nutrient Removal, 2009, p. 546-555.

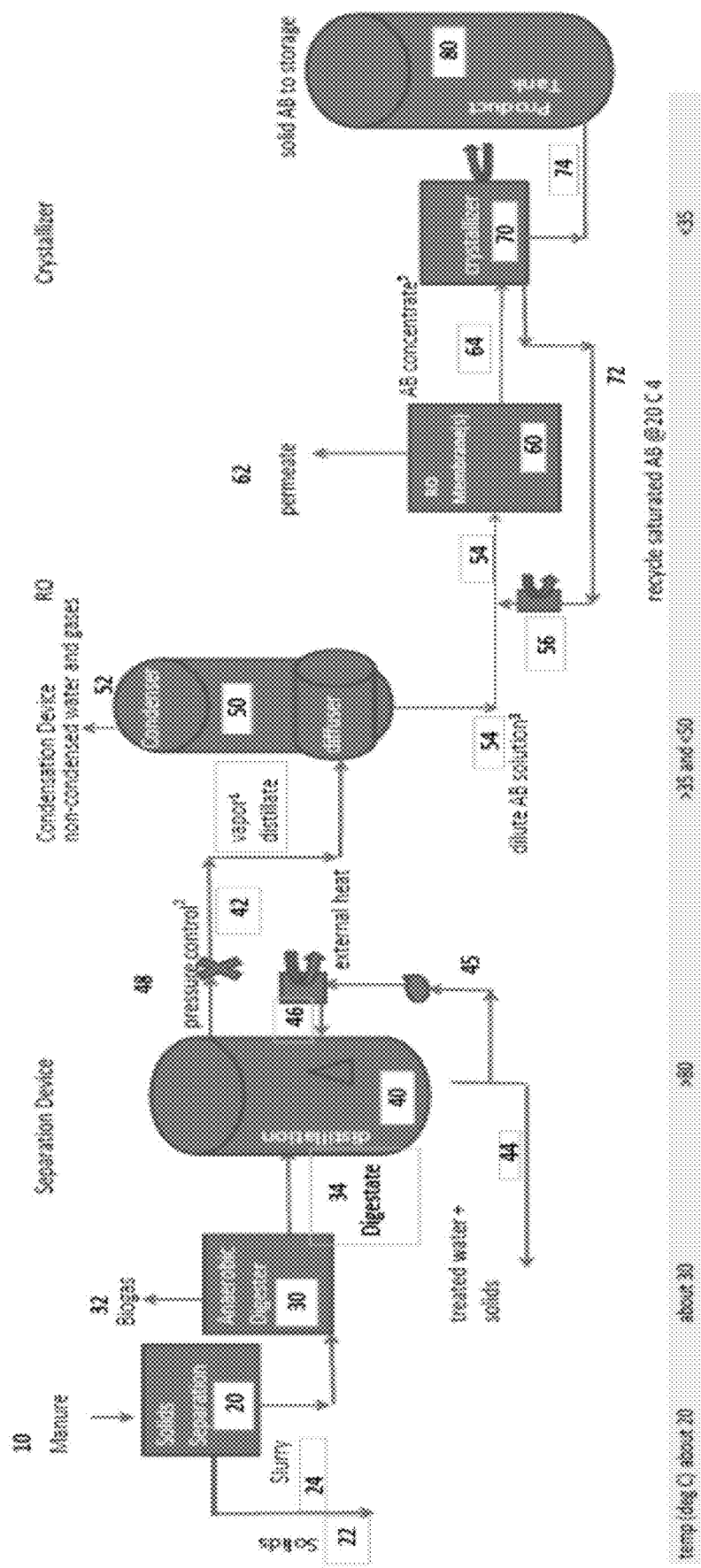

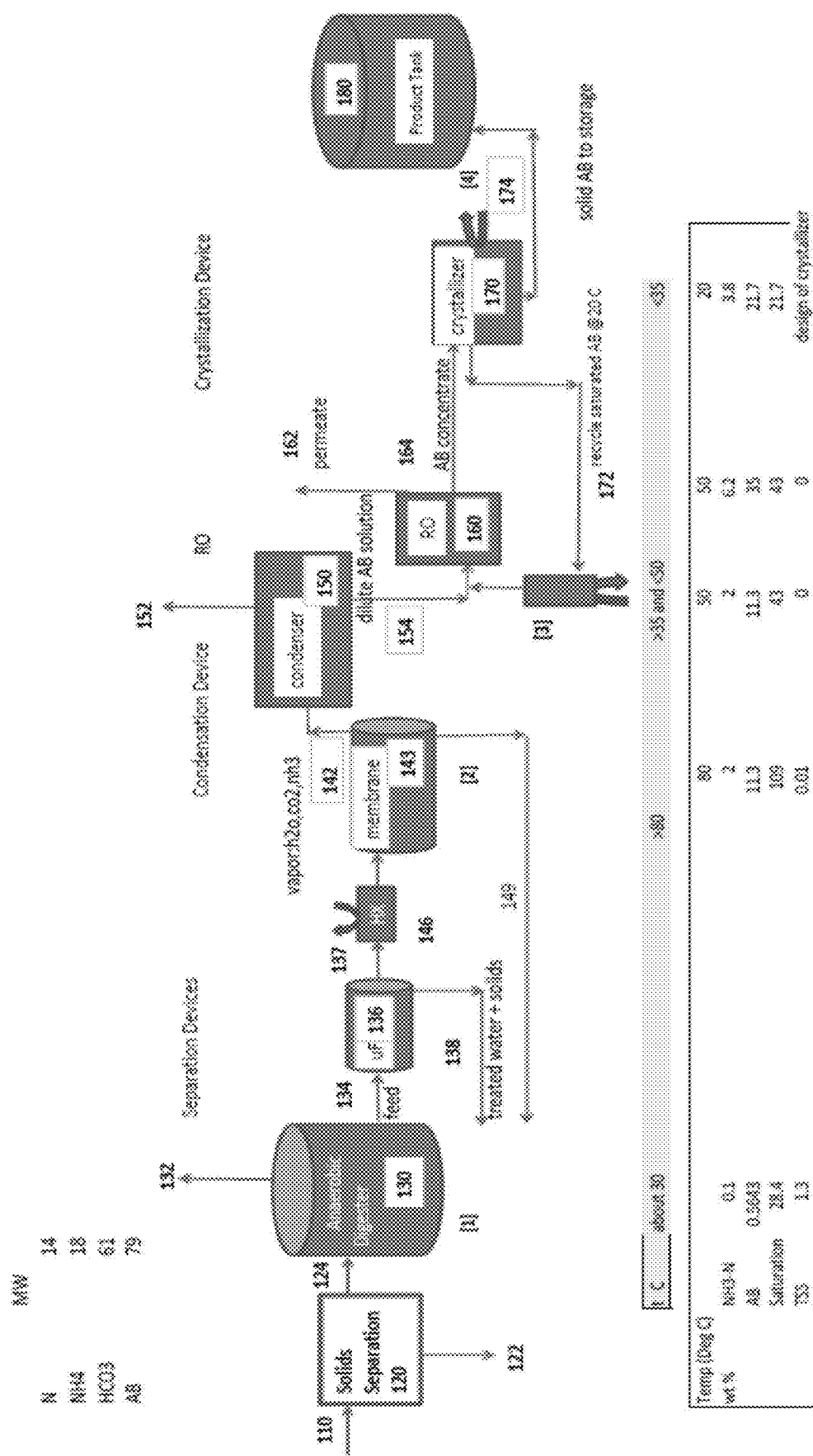
FIG. 2 - Process Flow for Ammonium Bicarbonate from Dairy Manure

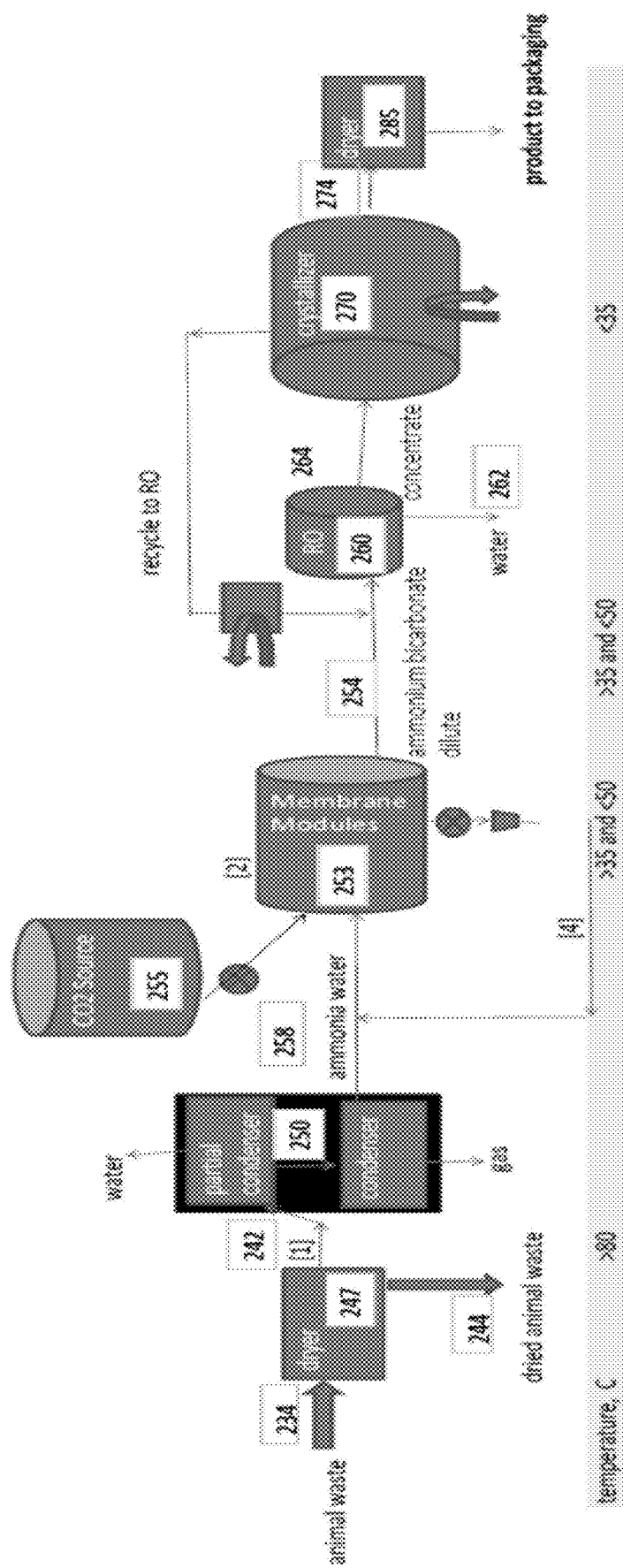

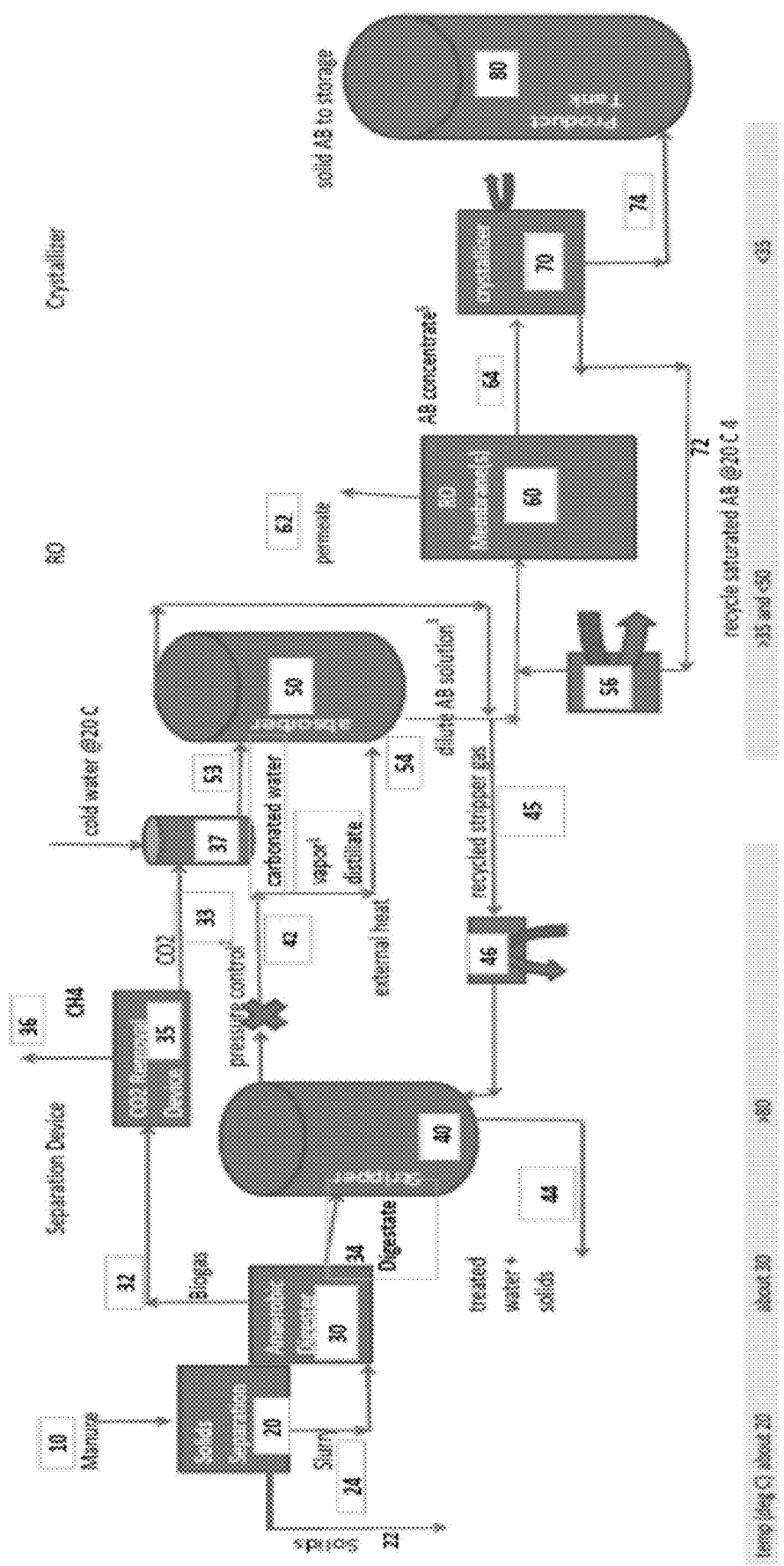

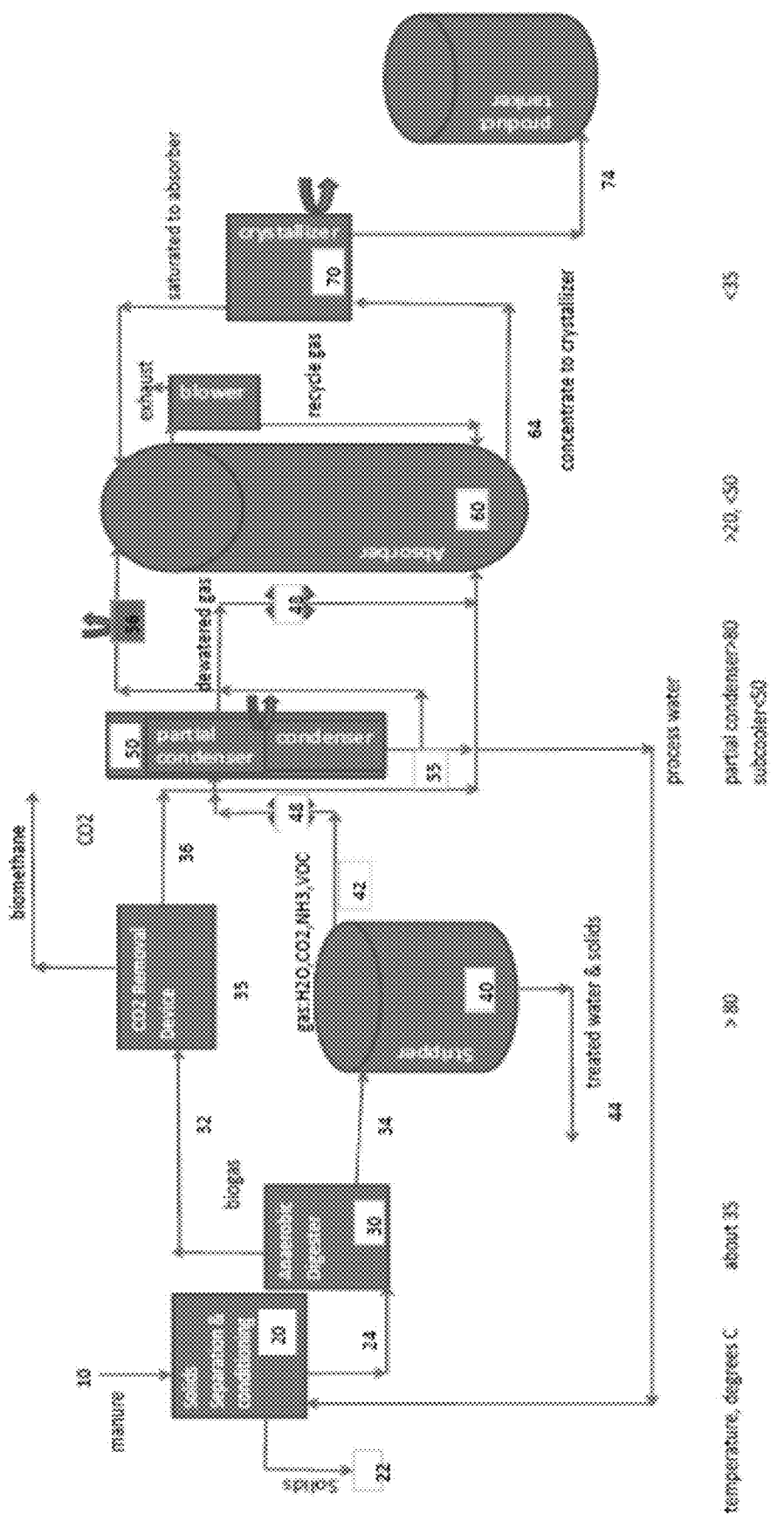

PROCESS TO RECOVER AMMONIUM BICARBONATE FROM WASTEWATER

CROSS REFERENCE TO RELATED APPLICATIONS

This application is a continuation application of U.S. application Ser. No. 16/790,390 filed on Feb. 13, 2020, now U.S. Pat. No. 11,254,581, which is a continuation application of U.S. application Ser. No. 15/638,193 filed on Jun. 29, 2017, now U.S. Pat. No. 10,604,432, which is a continuation in part of, and claims the benefit of, U.S. application Ser. No. 14/852,836 filed on Sep. 14, 2015, now U.S. Pat. No. 10,106,447, which claims the benefit of U.S. Provisional Application Ser. No. 62/103,191 filed on Jan. 14, 2015, and U.S. Provisional Application Ser. No. 62/133,549 filed on Mar. 16, 2015, each which is expressly incorporated herein in its entirety by reference thereto.

FIELD OF THE INVENTION

The present invention relates generally to a process, a method, and a system for the recovery and concentration of dissolved ammonium bicarbonate from a wastewater containing ammonia ($NH_3$) using gas separation, condensation, and filtration, each at controlled operating temperatures. The present Invention also relates generally to a process, a method, and a system for the recovery and concentration of dissolved ammonium bicarbonate from a wastewater containing ammonia ($NH_3$) using gas separation, condensation, and crystallization, each at controlled operating temperatures. Wastewaters may contain dissolved ammonia as ammonium ion and as dissolved ammonia gas; as well as dissolved carbon dioxide as bicarbonate and carbonate ions and as dissolved carbon dioxide gas. The word "ammonia" will be used generally to refer to any dissolved form of ammonia. The present invention also relates to a process, a method, and a system for the production of a nitrogen rich fertilizer from an ammonia ($NH_3$) containing wastewater using a process, method and/or system comprising the concentration of dissolved ammonium bicarbonate using gas separation and condensation, followed by crystallization of concentrated ammonium bicarbonate, all at controlled operating temperatures. More specifically, the present invention relates to a process, method, and system to produce, from a wastewater containing ammonia ($NH_3$), an organic solid containing high concentrations of nitrogen which could be utilized as a component ingredient in a nitrogen rich, organic fertilizer product. The process, method and system of the present invention is a useful improvement over existing technologies for the removal of ammonia from wastewaters because the present invention: converts NH3-N into ammonia gas but does not utilize any chemicals to increase pH, captures the ammonia gas in the form of a stable salt but does not utilize industrial acids to react with the ammonia, and produces a solid-fertilizer product with minimal use of energy.

The present invention allows for the production/synthesis of organic N-fertilizer, ammonium bicarbonate (AB) derived from wastewaters, sludges and solids containing ammonia ($NH_3$) or ammonia and carbon dioxide ($CO_2$), without the use of chemical additives.

BACKGROUND OF THE INVENTION

Anaerobic digestion is a common unit operation employed in the treatment of wastewaters containing organics and nitrogenous compounds including industrial, municipal and agricultural wastewaters. The resulting solid/liquid slurry from an anaerobic digester has a high-solids portion and a low-solids portion. For example, the digestate produced from dairy wastewater, contains a high-solids portion comprising largely cellulosic solids and a low-solids portion containing concentrations of dissolved carbon dioxide and dissolved ammonia nitrogen as well as salts and both suspended and dissolved organics. The dissolved ammonia nitrogen in the digestate presents significant environmental issues if left untreated, such as, when the digestate is land applied, discharged to a body of water, or sent to a holding pond or lagoon. Potential adverse air and water impacts include: ammonia (toxic to fish, irritating to human eyes and lungs) will be lost both to the air and water; ammonia will be biologically oxidized either in water or soil and chemically oxidized in the air, in either case forming gases that are irritants and can form ozone or greenhouse gases, etc. Most often regulations for ammonia release are designed to prevent excess nutrient input to surface waters which may cause eutrophication.

Effective treatment technologies are needed for agricultural and industrial waste streams that may release ammonia to the environment. For example, anaerobic digester digestate is often high in ammonia and their sources are required to remove ammonia nitrogen to avoid excessive nitrogen discharges.

One well-established technology for treatment of digestate is air stripping which uses hot air and/or steam to strip ammonia from the wastewater creating a liquid stream comprising substantially less dissolved ammonia and a heated gas containing the stripped ammonia. Formation of a solid precipitate containing ammonia, ammonium bicarbonate, and ammonium carbonate, during the air stripping process may foul the air stripping substrates causing operational and maintenance issues and thus is not desired. An increase of the pH of the wastewater shifts the equilibrium for ammonia away from dissolved ionized ammonium and more to ammonia gas. Accordingly, increased removal of the ammonia from digestate using air stripping is commonly achieved with chemical addition. Examples of chemicals used to increase pH include calcium, sodium or magnesium hydroxide. The stripped ammonia is absorbed into an acid solution. The use of acids is highly effective for ammonia recovery and could also be effective in producing a concentrated ammonium salt product using subsequent unit operations. On the other hand, treatment utilizing industrial chemicals to raise pH with a stripping process and for absorption of ammonia, such as, for example, for a treatment system for a dairy waste which produces a nutrient rich solid for use as a fertilizer, has the unavoidable consequence stemming from the use of such chemicals that any reusable end product cannot be certified as an "organic" product.

Stripper exhaust gas containing ammonia is sometimes released to the atmosphere although regulations typically require that it is further processed to capture the nitrogen. For example, U.S. Pat. No. 7,811,455 (Burke) describes a process for use of biogas rather than air and reclaiming ammonia from stripper exhaust gases in the form of ammonium bicarbonate by blending the CO2 in the digester biogas with the stripper gas and then precipitating and recovering ammonium bicarbonate with the added benefit of lowering CO2 in the biogas. One of the main drawbacks with that process is that the use of chemicals to raise the pH in the stripper precludes certification of the ammonium bicarbonate solids and any solids created from the ammonium bicarbonate solids as "organic" fertilizer. Another drawback is the inefficiency associated with processing large volumes of gas, including precipitation of ammonium bicarbonate in the gas phase.

There is a need for a waste treatment technology that converts wastewater containing nutrients into beneficial use materials that can be certified as organic. There is a need for a wastewater treatment technology that can remove dissolved ammonia nitrogen, react the resulting gaseous ammonia with carbon dioxide to re-form dissolved ammonium bicarbonate, concentrate the dissolved ammonium bicarbonate, and then capture the ammonium bicarbonate in crystalline form. There is a need for an improved manure treatment system comprising anaerobic digestion that does not utilize expensive, hazardous, chemicals to raise the pH of digestate, chemicals that present significant handling and storage issues. There is a need for an improved wastewater treatment system that effectively removes and recovers nitrogen in the form of ammonium bicarbonate without any chemical addition.

SUMMARY OF THE INVENTION

Applicants have invented a new process, system, and method for treating wastewater that satisfies these needs. While the invention will be described in connection with certain embodiments, it will be understood that the invention is not limited to those embodiments. To the contrary, the invention includes all alternatives, modifications and equivalents as may be included within the spirit and scope of the present invention.

High-ammonia and ammonium containing wastewaters are produced in many industrial and municipal processes. Agriculture is one of the largest sources of these wastewaters, in particular in the form of products from the anaerobic digestion of organic waste. Examples of sources of this waste are animal manure, meat processing, dairy processing, and silage. Ammonia (NH3) that is not captured in a stable chemical form is a potential source of air and water pollution.

The present invention provides a way to remove a substantial portion of the ammonia nitrogen within a liquid wastewater and capture the nitrogen in the form of crystallized ammonium bicarbonate using a series of unit operations operated under specified temperatures and without the use of chemicals to raise pH. The resulting ammonium bicarbonate solid is high in nitrogen content and could be used in combination with other materials to create a nitrogen rich organic fertilizer product.

In one embodiment, the present invention includes at least three components:
1) removal of the ammonia from the waste (including without limitation sludges, semi-solids, and solids and liquids) without the use of chemicals at a temperature of at least 80 degrees Celsius thereby converting the ammonia to gaseous form;
2) mixing of the gaseous ammonia with carbon dioxide and water vapor at a temperature of between about 20 and 50 degrees Celsius causing the formation of dissolved ammonium carbonate and ammonium bicarbonate in a liquid condensate and concentrating the dissolved ammonium carbonate and ammonium bicarbonate using reverse osmosis also operating at a temperature of between about 20 and 50 degrees Celsius; and
3) crystallizing the concentrated dissolved ammonium carbonate and ammonium bicarbonate at a temperature below 35 degrees Celsius such that the reverse osmosis concentrate becomes saturated with dissolved ammonium bicarbonate and ammonium carbonate which depends upon the concentrations of ammonium carbonate and ammonium bicarbonate to form solid ammonium bicarbonate and ammonium carbonate.

In a second embodiment using partial condensation of digester gases to eliminate the need for a filter (reverse osmosis), the present invention includes at least three components:
1) removal of the ammonia from the waste (including without limitation sludges, semi-solids, and solids and liquids) without the use of chemicals at a temperature of at least 80 degrees Celsius thereby converting the ammonia to gaseous form;
2) staged condensation and concentration of the gas containing gaseous ammonia, carbon dioxide, and water vapor, at a temperature at least 80 degrees Celsius to remove a significant amount of water vapor in liquid condensate form causing formation of a concentrated gas, followed by the formation of a concentrated dissolved ammonium bicarbonate liquid solution using absorption operating at a temperature of between about 20 and 50 degrees Celsius; and
3) crystallizing the concentrated dissolved ammonium carbonate and ammonium bicarbonate at a temperature below 35 degrees Celsius such that the concentrated dissolved ammonium carbonate and ammonium bicarbonate becomes saturated with dissolved ammonium bicarbonate and ammonium carbonate which depends upon the concentrations of ammonium carbonate and ammonium bicarbonate to form solid ammonium bicarbonate and ammonium carbonate.

The present invention is not limited to any one specific method or process to remove ammonia nitrogen from the waste but rather includes numerous alternatives provided the operating temperatures for the components are followed. Stripping animal manure digestate at a temperature of at least 60 degrees Celsius and preferably at a temperature of at least 80 degrees Celsius, for example, is one way to remove ammonia nitrogen from animal waste creating an exhaust gas containing ammonia gas. Examples of other ways to remove ammonia nitrogen from wastewaters and create an ammonia-containing gas include dryers, and filtration devices with membrane modules and heat sources.

Once the dissolved ammonia is removed from the waste and is in gaseous form, the present invention includes two paths for the creation of a concentrated solution of ammonium carbonate and ammonium bicarbonate, the first using condensation to convert gaseous ammonia, CO2 and water vapor to a liquid solution containing ammonium carbonate and ammonium bicarbonate followed by filtration, the second using staged condensation to remove a significant amount of water vapor from the gas by partial condensation causing formation of a concentrated gas, followed by the formation of a concentrated dissolved ammonium bicarbonate liquid solution using absorption of ammonia from said gas. The present invention then uses crystallization to form solid ammonium bicarbonate and ammonium carbonate.

When using condensation and reverse osmosis, the present invention includes condensing the gaseous ammonia with carbon dioxide and water vapor at a temperature of between about 35 and 50 degrees Celsius causing the formation of dissolved ammonium carbonate and ammonium bicarbonate in a liquid condensate. Depending upon the characteristics of the waste and the preceding treatment processes, the amount of carbon dioxide within the ammonia-containing gas may be enough to convert substantially all of the ammonia into ammonium carbonate and ammonium bicarbonate without addition of carbon dioxide. Digested dairy manure, for example, put through a stripping process operated at greater than 80 degrees Celsius should create an exhaust gas containing enough carbon dioxide for the conversion of substantially all of the gaseous ammonia to dissolved ammonium carbonate and ammonium bicarbonate. The net result of the process is to recover ammonium bicarbonate and ammonium carbonate from the mixture of materials constituting the digestate as a high purity solution of ammonium bicarbonate and ammonium carbonate in the condensate. The formation of the ammonium carbonate and ammonium bicarbonate without the use of chemicals in the ammonia removal step, and without an outside source for carbon dioxide permits organic certification of the eventually created nitrogen rich solids. If additional carbon dioxide is required, the organic certification can still be used if the carbon dioxide is from non-synthetic sources. While organic fertilizers have a significant financial advantage over non-organic fertilizers, the present invention is not limited solely to a process, method, or system resulting in organic products. The present invention also includes addition of carbon dioxide from outside sources resulting in products unable to be certified as organic.

The dissolved ammonium carbonate and ammonium bicarbonate in the resulting condensate liquid is then concentrated. A two-stage reverse osmosis unit operating between about 20 and 50 degrees Celsius, for example concentrates dissolved ammonium carbonate and ammonium bicarbonate to about 10 times the ammonium concentration of the condensate, but the increase could be anywhere from 1.5 to 20 times the concentration of the ammonium concentration in the condensate. More preferably, a two-stage reverse osmosis unit operating between about 35 and 50 degrees Celsius, concentrates dissolved ammonium carbonate and ammonium bicarbonate more efficiently.

When using condensation and absorption, the present invention includes condensing the gaseous ammonia is a staged manner at a temperature of at least 80 degrees Celsius in the first stage to remove a significant amount of water vapor in liquid condensate form causing formation of a concentrated ammonia and carbon dioxide gas. Removing the water vapor and concentrating the ammonia and carbon dioxide gas at this point instead of condensing the gas with all the water vapor eliminates the need to concentrate the ammonium bicarbonate solution after condensation using filters. It may eliminate the need, cost, and maintenance expense of a filtering unit process, potentially providing a more efficient and cost effective overall process. The concentrated ammonia and carbon dioxide gas is then treated using absorption (an absorption column, for example) operating at a temperature of between about 20 and 50 degrees Celsius to form a concentrated dissolved ammonium bicarbonate liquid solution.

The liquid containing concentrated dissolved ammonium carbonate and ammonium bicarbonate is then cooled to less than about 35 degrees Celsius to saturate the reverse osmosis or absorption concentrate and form solid ammonium bicarbonate and ammonium carbonate which is stable and high in nitrogen content. Moreover, resulting solids are substantially free of phosphorous. The solid ammonium bicarbonate can be stored and/or combined with other materials to create nitrogen rich fertilizer.

Although the detailed chemistry for the formation of ammonium bicarbonate from ammonia and carbon dioxide is complex, the reactions provide predictable behaviors at temperatures and pressures accessible under normal industrial and agricultural conditions. At biological pH about 8, ammonium bicarbonate is stable in solutions below about 50 degrees Celsius and rapidly decomposes in solutions above about 80 degrees Celsius, as displayed in Table 2 below. The present invention utilizes the varying stability and solubility of ammonium bicarbonate at different temperatures and pressures a) to drive substantially all of the dissolved ammonium out of the wastewater and into gaseous form (which occurs at a temperature of about 80 degrees Celsius (Table 2) and is complete at a temperature of about 90 degrees Celsius (Table 1)), b) so that it can be condensed with carbon dioxide and water vapor and concentrated at a lower temperature (at a temperature of between about 35 and 50 degrees Celsius) where ammonium bicarbonate is stable, thereby converting the ammonia to dissolved ammonium bicarbonate in a concentrated liquid form, and c) so that the concentrated dissolved ammonium bicarbonate can be solidified at a lower temperate (less than about 20 degrees Celsius).

The following table shows how the solubility (and stability) of ammonium bicarbonate varies with temperature. Weast, R. C. (ed.) Handbook of Chemistry and Physics. 69th ed. Boca Raton, FL: CRC Press Inc., 1988-1989; Perry's Chemical Engineers' Handbook, 6th Edition, McGraw Hill, 1997.

TABLE 1

Variation of solubility of different substances (mostly inorganic compounds) in water with temperature, under 1 atmosphere pressure. Units of solubility are given in grams per 100 grams of water (g/100 g)

| | | Temperature (Degrees C.) Range | | | | | | | | | |
| --- | --- | --- | --- | --- | --- | --- | --- | --- | --- | --- | --- |
| Substance | Formula | 10 | 15 | 20 | 30 | 40 | 50 | 60 | 70 | 80 | 90 | 100 |
| Ammonium bicarbonate | $NH_4HCO_3$ | 16.1 | | 21.7 | 28.4 | 36.6 | | 59.2 | | 109 | dec | |
| Ammonium carbonate | $(NH_4)_2CO_3 \cdot H_2O$ | | | 10 | | | | dec | | | | |
| Ammonium nitrate | NH4NO3 | 150 | | 192 | 242 | 297 | 344 | 421 | 499 | 580 | 740 | 871 |
| Ammonium sulfate | (NH4)2SO4 | 73 | | 75.4 | 78.1 | 81.2 | 84.3 | 87.4 | | 94.1 | | 103 | dec = decomposition of compound at specified temperature

TABLE 2

Fraction of ammonia-N in the form of ammonia gas at conditions of pH and temperature.

| T K | T C | pKa | T F\ pH | $f = 1/(1 + 10^{(pKa - pH)})$ | | | | |
|---|---|---|---|---|---|---|---|---|
| | | | | 7 | 8 | 9 | 10 | 11 |
| 300 | 27 | 9.20 | 80 | 0.01 | 0.06 | 0.39 | 0.86 | 0.98 |
| 322 | 49 | 8.57 | 120 | 0.03 | 0.21 | 0.73 | 0.96 | 1.00 |
| 333 | 60 | 8.29 | 140 | 0.05 | 0.34 | 0.84 | 0.98 | 1.00 |
| 344 | 71 | 8.02 | 160 | 0.09 | 0.49 | 0.90 | 0.99 | 1.00 |
| 355 | 82 | 7.78 | 180 | 0.14 | 0.63 | 0.94 | 0.99 | 1.00 | pKa from National Research Council. Ammonia. University Park Press, Baltimore, MD (1979).

BRIEF DESCRIPTION OF THE DRAWINGS

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 1 is a schematic drawing of one embodiment of the invention for the treatment of cattle manure (e.g., from a CAFO) comprising solids separation, anaerobic digestion, stripping, condensation, concentration using reverse osmosis, and crystallization.

FIG. 2 is a schematic drawing of another embodiment of the invention for the treatment of dairy manure (e.g., from a CAFO) comprising solids separation, anaerobic digestion, ultra filtration with heating and membrane filtration, condensation, concentration using reverse osmosis, crystallization, and storage.

FIG. 3 is a schematic drawing of another embodiment of the invention for the treatment of an ammonia-containing wastewater (e.g., from layer manure) comprising heat drying, condensation of ammonia water, dissolution of carbon dioxide into the ammonia water using membrane filters, concentration of ammonium bicarbonate, crystallization, and storage.

FIG. 4 is a schematic drawing of another embodiment of the invention for the treatment of cattle manure (e.g., from a CAFO) comprising solids separation, anaerobic digestion, stripping, absorption, concentration using reverse osmosis, and crystallization. The carbon dioxide dissolved in solution within the anaerobic digester's digestate, which derives directly from the cattle manure waste, is supplemented by carbon dioxide removed from the biogas.

FIG. 5 is a schematic drawing of another embodiment of the invention for the treatment of livestock manure (e.g., from a CAFO) comprising solids separation, anaerobic digestion, stripping, condensation, absorption, and crystallization. The carbon dioxide dissolved in solution within the anaerobic digester's digestate, which derives directly from the livestock manure waste, may be supplemented by carbon dioxide removed from the biogas.

DETAILED DESCRIPTION OF THE INVENTION

The accompanying drawings, which are incorporated in and constitute a part of this specification, illustrate embodiments of the invention and, together with the general description of the invention given above and the detailed description of an embodiment given below, serve to explain the principles of the present invention. Similar components of the devices are similarly numbered for simplicity.

FIG. 1 is a process flow schematic drawing of one embodiment of the invention for the treatment of cattle manure (e.g., from a CAFO) comprising solids separation, anaerobic digestion, stripping, condensation, concentration, and crystallization. In the process according to FIG. 1, there is no chemical addition to adjust pH prior to, or in, the stripping process. The present invention excludes the use of pH adjustment chemicals. In the process according to FIG. 1, there is also no external supply of carbon dioxide. The carbon dioxide dissolved in solution within the anaerobic digester's digestate, which derives directly from the cattle manure waste, is the sole source for carbon dioxide in the process.

As depicted in FIG. 1, raw manure 10 with or without associated dairy waste generated at the CAFO is transported to a solids separation unit/process 20 (it being understood that a mixing or holding tank/vessel could be used prior to solids separation and/or can be used for solids separation). The solids separation unit/process may be a single stage or chamber unit or it could be a series of stages or chambers for coarse solids separation and intermediate solids separation.

The slurry/effluent 24 from the solids separation unit 20 is input into an anaerobic digester 30 which digests much, preferably most, of the dissolved organics and small organic particulates to produce biogas 32 and an effluent digestate 34.

The effluent digestate 34 from the anaerobic digester 30 contains residual solids, dissolved salts and organics, and concentrations of dissolved ammonia and carbon dioxide. The present invention collects the ammonia and carbon dioxide and captures them in a subsequent multistage process to re-form solid ammonium bicarbonate. Each stage of the subsequent multistage process operates at different temperatures to take advantage of the solubility properties of ammonium bicarbonate for its concentration in dissolved form and then its formation as a nitrogen rich solid.

The temperature of digestate 34 out of a typical anaerobic digester treating cattle manure is about 35 degrees Celsius. For the process of the invention, the digestate needs to be heated to greater than about 80 degrees Celsius for treatment in the stripper 40.

The stripper operating at a temperature of greater than about 80 degrees Celsius, without any chemical addition to increase pH, removes dissolved ammonia and dissolved carbon dioxide from the digestate 34 creating exhaust vapor 42 containing water vapor, gaseous carbon dioxide, and gaseous ammonia. Vapor 42 will also contain traces of organic volatiles and semi-volatiles. In FIG. 1, footnote 1 denotes the vapor is constant composition for continuous operation and varies during a batch process—H20, CO2, and NH3 evolve with traces of organic volatiles and semi volatiles. The treated water and solids 44 out of the stripper can be further treated for application to land or water using current treatment technologies. The temperature of the stripper 40 can be maintained using a heat exchanger 46. The vapor 42 created by stripping the digestate 34 in that first stage, the separation stage, is then treated in a second condensation and concentration stage to create a concentrated dissolved ammonium bicarbonate solution.

Condenser 50 and reverse osmosis filter 60 are then used to treat vapor 42 at a temperature of between about 35 degrees Celsius and 50 degrees Celsius. A pressure control valve 48 can be used between the stripper 40 and the condenser 50 to maintain a differential between the two. In FIG. 1, footnote 2 denotes pressure control valve is set to maintain differential between distillation unit and condenser—Condenser temperature, T, must be less than 50 degrees Celsius to keep NH4 and HCO3 in solution, while distillation temperature must be greater than 80 degrees Celsius to convert to NH3 and CO2. Operating the condenser 50 between about 35 and 50 degrees Celsius allows the water vapor, ammonia, and carbon dioxide to form dissolved ammonium bicarbonate. Maintaining between about 35 and 50 degrees Celsius in the condenser 50, and a pH less than 9, prevents precipitation of dissolved ammonium bicarbonate or ammonium carbonate and keeps it in dissolved form. The temperature of the condenser 50 can be maintained using a heat exchanger 56. The non-condensed water and gases 52 exiting the condenser 50 can be discharged to the atmosphere. In FIG. 1, footnote 3 denotes AB solution in condenser is distillate of feed to stripping device.

Following the condenser 50, and operating at about the same temperature as the condenser 50, the effluent ammonium bicarbonate solution 54 is treated in a reverse osmosis filter 60. Reverse osmosis filter 60 removes water thereby concentrating the ammonium bicarbonate in the solution. The resulting concentrated effluent 64 out of the reverse osmosis filter 60 contains about 50-100 times the concentration of dissolved ammonium bicarbonate in the digestate 34. In FIG. 1, footnote 5 denotes AB concentrate is supersaturated relative to temperature of crystallizer. Control of the reverse osmosis temperature avoids precipitation of the ammonium bicarbonate on the membrane while achieving a concentration sufficient for saturation at the temperature in the crystallizer. The permeate 62 is a clean water than can be reused or discharged.

The concentrated effluent 64 out of the reverse osmosis filter 60 is then treated at a temperature of less than about 35 degrees Celsius in stage three using a crystallizer 70. It is understood that lower temperatures, e.g., 20 degrees Celsius, could be used in the crystallizer depending upon the concentrations of dissolved ammonium carbonate and ammonium bicarbonate in the reverse osmosis concentrate. Solid crystals of ammonium bicarbonate are grown in the crystallizer 70 under controlled conditions, separated from the liquid fraction to produce an ammonium-salt 74 which may be dried, pelletized or granulated to form a final product. In some embodiments, a portion of the saturated ammonium bicarbonate supernatant is recycled 72 to the reverse osmosis filter 60, after it is heated to the required temperature in a heat exchanger 56. In FIG. 1, footnote 4 denotes heat exchange on recirculation liquid to minimize size of heat exchanger 56 to match temperature of reactor liquid.

Due to the unique sequence of the preceding unit operations, the resulting ammonium salt may be dried and packaged for commercial distribution as a specialized nitrogen fertilizer, that is high-purity, phosphorus free, and certified USDA organic. The resulting product is high-purity and phosphorous free due to the two purification operations, namely, 1) the distillation process which removes ammonia and separates it from salts that are left behind in the distillation unit's liquid effluent, and 2) the crystallization process which removes solid ammonium bicarbonate from other contaminants including traces of phosphorous containing salts. If synthetic chemicals are not used in obtaining the solids or liquid digestate, the ammonium bicarbonate product will have the potential for designation as organic (USDA 2012) fertilizer. The USDA designation is of economic importance as the price of organic fertilizer expressed as dollars per pound ammonia nitrogen, is materially higher than that of chemical (non-organic) fertilizers that are equally uniform, high purity, and concentrated sources of NH3-N. As with synthetic fertilizer, the material is nearly odorless, and has low transport and application costs relative to manure and digestate. If the ammonia is captured with an industrial acid or is derived from application of caustic or other industrial alkali—it will not qualify as organic fertilizer. The ammonium salt according to the invention resolves this conflict by (1) producing ammonia gas thermally with no chemical addition, and (2) using the carbon dioxide found in the digestate to recover the ammonia from the digestate to form an organic fertilizer, ammonium bicarbonate.

The ammonium salt 74 can be stored 80 for use on or off site.

Another embodiment of the invention for a wastewater that utilizes solids reduction prior to membrane separation of ammonia is shown in FIG. 2. In such instances, stage 1 of the foregoing described process can be modified to remove solids (effluent suspended solids of 0.1% or less) so that a membrane separation device could be employed to separate the gases water vapor, carbon dioxide, and ammonia from the digestate liquid.

As depicted in FIG. 2, raw manure 110 with or without associated dairy waste generated at the CAFO is transported to a solids separation unit/process 120 (it being understood that a mixing or holding tank/vessel could be used prior to solids separation or for the separation). The solids separation unit/process 120 may be a single stage or chamber unit or it could be a series of stages or chambers. In FIG. 2, the footnotes 1-4 denote the following:

[1]—mesophilic digester, 35 C
  digested dairy manure, typical ammonia nitrogen is 1000 ppm
  AB is ammonium bicarbonate. Calculated from NH3-N and MW ratio
  AB concentration is 1% of saturation at 35 C
  digested manure is high in TSS
  No pH adjustment by either chemical addition or CO2 removal

[2]—gas from Separation Device has 20× concentration of ammonia as input
  NH3-N is 60% NH3 at 80 C, 34% NH3 at 60 C, and 4% NH3 at 20
  Temperature must be about 80 C or higher to convert NH4+ to NH3
  AB concentration is about 5% of saturation at 80 C
  Nearly all the TSS is removed by the uF

[3]—Condensate <50 C to convert dissolved NH3 and CO2 to dissolved AB, and >35 C to avoid precipitation in lines or RO
  AB concentrate from RO is about 81% of saturation at 50 C
  pH must be less than 9 to avoid carbonate formation and precipitation
  Recycle of liquor from crystallizer to RO has about the same concentration as the RO concentrate, and must be heated to the RO temperature

[4] Solids from crystallizer are high-purity, certifiable organic N-fertilizer

The output/effluent from the solids separation unit 124 is input into an anaerobic digester 130 which digests much, preferably most, of the dissolved organics and small organic particulates to produce biogas 132 and an effluent digestate 134.

The temperature of digestate 134, about 35 degrees Celsius, is heated to greater than about 80 degrees Celsius for treatment in stage 1, as described in detail below. Here again, as for the previous embodiment, the invention excludes the addition of chemicals to increase pH and also excludes the addition of carbon dioxide from a non-organic source (preferably, the carbon dioxide used in the process comes directly from the waste being treated). For the embodiment shown in FIG. 2, an input vapor similar to that created in the foregoing embodiment shown in FIG. 1 containing water vapor, gaseous carbon dioxide, and gaseous ammonia, is created using a different unit process than shown in FIG. 1. In FIG. 2, the separation of the gaseous ammonia and gaseous carbon dioxide from the digestate 134 is accomplished using a membrane device 143 instead of a stripper. The membrane passes gases, such as water vapor, ammonia, and carbon dioxide, but not liquid water. It therefore performs the same gas-separation function as the separation device shown in stage 1 of FIG. 1.

As shown in FIG. 2, the digestate 134 is treated for solids removal prior to stage 1, the ultrafilter 136, and prior to gas separation in the membrane device 143. An ultra filter 136 is shown in FIG. 2 for the solids removal it being understood that other solids removal methods producing the equivalent result of fine solids removal, for example passing only solids of less than 0.5 micron, are included within the scope of the invention. The concentrated solids 138 from the ultra filter 136 can be mixed with the solids from the initial solids separation step, or processed as a high phosphorus solid product. The ultra filter 136 removes a substantial portion of the total suspended solids in the digestate. The low suspended-solids (0.1% or less) digestate 137 is then treated in the gas-separation process of the invention which in this embodiment includes use of membrane device 143. The temperature of the low-solids digestate 137 is raised to at least about 80 degrees Celsius using a heat exchanger 146. Membrane device 143 includes a hydrophobic membrane that allows gas molecules to pass, such as water vapor, ammonia, and carbon dioxide, but not the liquid and its contaminants. The preceding uF is required to remove solids and organic material that might otherwise foul the hydrophobic membrane. Vapor 142 will also contain traces of organic volatiles and semi-volatiles. The treated water and solids 149 out of the membrane device 143 can be further treated for application to land or water using current treatment technologies.

The vapor 142 created from the digestate using the membrane device 143 in that first stage, the separation stage, is then treated in stage 2 and stage 3 using condensation and concentration, respectively, followed by crystallization, similar to the embodiment shown in FIG. 1.

Condenser 150 and reverse osmosis filter 160 are used to condense vapor 142 and concentrate its condensate 154 at a temperature of between about 35 and 50 degrees Celsius, to hold stable ammonium bicarbonate in solution. The effluent ammonium bicarbonate solution 154 out of the condenser 150 contains the dissolved ammonium bicarbonate from the ammonia and carbon dioxide of the digestate 134. The non-condensed water and gases 152 exiting the condenser 150 can be discharged to the atmosphere.

Following the condenser 150, and operating at about the same temperature as the condenser 150, the effluent ammonium bicarbonate solution 154 is treated in a reverse osmosis filter 160. Reverse osmosis filter 160 removes water thereby concentrating the ammonium bicarbonate in the solution. The resulting concentrated effluent 164 out of the reverse osmosis filter 160 contains about 10 times the concentration of dissolved ammonium bicarbonate in the condenser effluent 154. The permeate 162 is a clean water than can be reused or discharged.

The concentrated effluent 164 out of the reverse osmosis filter 160 is then treated at a temperature of less than about 35 degrees Celsius, preferably less than 20 degrees Celsius, in stage 3 using a crystallizer 170. Solid crystals of ammonium bicarbonate are grown in the crystallizer 170 under controlled conditions, separated from the liquid fraction to produce an ammonium-salt 174 which may be dried, pelletized or granulated to form a final product. In some embodiments, a portion of the saturated ammonium bicarbonate supernatant is recycled 172 to the reverse osmosis filter 160.

A resulting ammonium salt 174 solid, having physical and chemical properties as stated above for the first embodiment will result. The ammonium salt can be stored 180 for use on or off site.

Yet another embodiment of the invention using an external source for carbon dioxide is shown in FIG. 3. Such an embodiment could be used for wastes that do not contain the carbon dioxide needed to convert the ammonia to ammonium bicarbonate. Examples of such wastes include waste not processed using anaerobic digestion, such as high-solids manure or other organic waste. In the embodiment shown in FIG. 3, as compared to the embodiment shown in FIG. 1, stage 1 and stage 2 are modified. In FIG. 3, stage 1 comprises a dryer 247 in place of a stripper and stage 2 includes the addition of membrane modules 253 with a source of carbon dioxide 255 along with a condenser 250 and a reverse osmosis filter 260. In FIG. 3, the footnotes 1-4 denote the following:

[1]—dryer exhaust to 2-stage condenser
 ammonia water at 2× exhaust ammonia concentration, temperature between 20 and 35 C
[2]—ammonia stabilized with CO2 as acid
 P adjusted to provide CO2 to stabilize ammonia water in effluent
 CO2 flow rate equals CO2 as HCO3 in effluent liquid.
[3]—Ammonium bicarbonate at 20 C in cystallizer
 Mother liquor recycled to RO, and must be heated to the RO temperature
[4]—inject compressed vent gas (CO2, H20, NH3) into ammonia water feed line.

Here again, as for the previous embodiments, the invention excludes the addition of chemicals to increase pH. For the embodiment shown in FIG. 3, a solution of ammonium bicarbonate is created and crystallized as in the foregoing embodiments shown in FIGS. 1 and 2. In FIG. 3, the separation of the gaseous ammonia from the waste 234 is performed using a dryer 247, an ammonia water is created using condensers 250, and gaseous carbon dioxide is contacted with the ammonia water solution using membrane device 253 to create a solution of ammonium bicarbonate.

As depicted in FIG. 3, the waste (such as layer manure) 234 is treated in stage 1 of the process of the invention which in this embodiment includes use of dryer 247. The temperature of the dryer is at least about 80 degrees Celsius. Dryer 247 operates at a sufficiently high temperature that the ammonia in the waste is converted to gas and removed with the water vapor. The dryer functions as a separation device in a manner analogous to the distillation process 40 in FIG. 1. The exhaust vapor 242 from the dryer 247 contains water vapor and gaseous ammonia and lower than desired concentrations of carbon dioxide. In this embodiment, it is assumed that there is an insufficient amount of carbon dioxide in the waste to react with and convert substantially all of the gaseous ammonia into dissolved ammonium bicarbonate and thus, additional carbon dioxide is required. The dried waste 244 out of the dryer 247 can be processed further into solid products such as fertilizer, animal feed supplement, or fuel.

The vapor 242 created using the dryer 247 in stage 1, the separation stage, is then treated in stage 2 using condensation, carbon dioxide addition, and concentration.

FIG. 3 shows an example of a two-step condenser 250 to create an ammonia water 258 from the dryer exhaust gas 242. The first step removes about one half of the water and nearly no ammonia (NH3) and the second step is complete condensation producing ammonia water at about 50 degrees Celsius or less. The concentration of the dissolved ammonia in the condensate will be about twice that in the dryer vapor, for example about 0.5% by weight. The non-condensed water and gases 252 exiting the condenser 250 can be discharged to the atmosphere.

The ammonia water 258 is then treated in a membrane device 253 where an external source of gaseous carbon dioxide 255 is added. The gaseous carbon dioxide passes through the membrane, dissolves into the ammonia water, and reacts to create a solution of ammonium bicarbonate 254. For example, the solution of ammonium bicarbonate may be 2.3% by weight ammonium bicarbonate at about pH 6.5-8.5, depending on the amount of CO2 added and the temperature.

The ammonium bicarbonate 254 is then treated in a reverse osmosis filter 260. Reverse osmosis filter 260 removes water thereby concentrating the ammonium bicarbonate in the solution. The resulting concentrated effluent 264 out of the reverse osmosis filter 260 contains about 20 times the concentration of ammonia in the dryer gas. The permeate 262 is a clean water than can be reused or discharged. Stage 2 which includes the condenser 250, the membrane device 253 and the reverse osmosis filter 260 operate at a temperature of between about 35 degrees Celsius and 50 degrees Celsius.

The dissolved ammonium bicarbonate solution 264 is then treated in stage 3 using crystallization, similar to the embodiments shown in FIGS. 1 and 2. The concentrated effluent 264 out of the reverse osmosis filter 260 is cooled to a temperature of less than about 35 degrees Celsius in stage 3 using a crystallizer 270. Solid crystals of ammonium bicarbonate are grown in the crystallizer 270 under controlled conditions, separated from the liquid fraction to produce an ammonium-salt 274 which may be dried (such as using dryer 285), pelletized or granulated to form a final product.

A resulting ammonium salt solid having physical and chemical properties as stated above for the first and second embodiments will result. However, the certification as an organic product is contingent upon use of carbon dioxide produced organically. If synthetic carbon dioxide is used, the ammonium bicarbonate product cannot be designated as an organic fertilizer.

Carbon dioxide produced by fermentation of either animal waste or agricultural material (for example to produce ethanol) is certifiably organic; and is readily available from agricultural sources to assure that the carbon dioxide is neither synthetic nor contaminated with synthetic carbon dioxide.

FIG. 4 is a process flow schematic drawing of a variation on the embodiment of the invention shown in FIG. 1 for the treatment of cattle manure (e.g., from a CAFO) comprising solids separation, anaerobic digestion, stripping, absorption, concentration, and crystallization. In the process according to FIG. 4, there is no chemical addition to adjust pH prior to, or in, the stripping process. The present invention excludes the use of pH adjustment chemicals. In the process according to FIG. 4, there is also no external supply of carbon dioxide. The carbon dioxide dissolved in solution within the anaerobic digester's digestate, which derives directly from the cattle manure waste, is supplemented by carbon dioxide from the biogas to assure maintenance of CO2 in the water to stabilize the ammonia in the absorber column. FIG. 4 shows the biogas 32 processed in a CO2 removal device 35 to provide CO2 to provide carbonated water for capture of ammonia as ammonium bicarbonate. For example, the device could be a pressure swing adsorption device which is commonly used to separate gases, such as CH4 and CO2, with materially different properties. In FIG. 4, footnotes 1-5 denote the following:

[1]—vapor is constant composition for continuous operation and varies during a batch process. H20, CO2, and NH3 evolve with traces of organic volatiles and semi-volatiles.

[2]—pressure control valve is set to maintain differential between stripper unit and absorber. Absorber temperature, T, must be less than 50 C to keep NH4 and HCO3 in solution, while stripper temperature must be greater than 80 C to convert to NH3 and CO2.

[3]—AB solution in absorber is formed from Digester biogas

[4]—HX on recycled stripper gas to match temperature of stripper liquid.

[5]—AB concentrate is supersaturated relative to temperature of crystallizer.

As depicted in FIG. 4, raw manure 10 with or without associated dairy waste generated at the CAFO is transported to a solids separation unit/process 20 (it being understood that a mixing or holding tank/vessel could be used prior to solids separation and/or can be used for solids separation). The solids separation unit/process may be a single stage or chamber unit or it could be a series of stages or chambers for coarse solids separation and intermediate solids separation.

The slurry/effluent 24 from the solids separation unit 20 is input into an anaerobic digester 30 which digests much, preferably most, of the dissolved organics and small organic particulates to produce biogas 32 and an effluent digestate 34.

The effluent digestate 34 from the anaerobic digester 30 contains residual solids, dissolved salts and organics, and concentrations of dissolved ammonia and carbon dioxide. The present invention collects the ammonia and carbon dioxide and captures them in a subsequent multistage process to form solid ammonium bicarbonate. Each stage of the subsequent multistage process operates at different temperatures to take advantage of the solubility properties of ammonium bicarbonate for its concentration in dissolved form and then its formation as a nitrogen rich solid.

The temperature of digestate 34 out of a typical anaerobic digester treating cattle manure is about 35 degrees Celsius. For the process of the invention, the digestate needs to be heated to greater than about 80 degrees Celsius for treatment in the stripper 40.

The stripper operating at a temperature of greater than about 80 degrees Celsius, without any chemical addition to increase pH, uses gas (biogas, CH4, CO2, air, etc) to remove dissolved ammonia and dissolved carbon dioxide from the digestate 34 creating exhaust vapor 42 containing water vapor, gaseous carbon dioxide, and gaseous ammonia. Vapor 42 will also contain traces of organic volatiles and semi-volatiles. The treated water and solids 44 out of the stripper can be further treated for application to land or water using current treatment technologies. The temperature of the stripper 40 can be maintained using a heat exchanger 46 to heat the recycled stripper gas 45 from the absorber. The vapor 42 created by stripping the digestate 34 in that first stage, the separation stage, is then treated with a cold water stream 53 saturated with CO2, in an absorption stage 50 to create a dissolved ammonium bicarbonate solution. Ammonia is removed from the vapor distillate, producing recycled stripper gas 45 which is heated in heat exchanger 46 prior to entry at the bottom of stripper 40.

Absorber 50 and reverse osmosis filter 60 are used to treat vapor 42 at a temperature of between about 35 degrees Celsius and 50 degrees Celsius. A pressure control valve 48 can be used between the stripper 40 and the absorber 50 to maintain a differential between the two. Operating the absorber 50 between about 35 and 50 degrees Celsius allows the water vapor, ammonia, and carbon dioxide to form dissolved ammonium bicarbonate. Maintaining between about 35 and 50 degrees Celsius in the absorber 50, and a pH less than 9, prevents precipitation of dissolved ammonium bicarbonate or ammonium carbonate and keeps it in dissolved form. Temperature of the absorber 50 can be maintained by control of the flow and temperature of the cold water 53.

Following the absorber 50, and operating at about the same temperature as the absorber 50, the effluent ammonium bicarbonate solution 54 is treated in a reverse osmosis filter 60. Reverse osmosis filter 60 removes water thereby concentrating the ammonium bicarbonate in the solution. The resulting concentrated effluent 64 out of the reverse osmosis filter 60 contains about 50-100 times the concentration of dissolved ammonium bicarbonate in the digestate 34. Control of the reverse osmosis temperature is critical to avoid precipitation of the ammonium bicarbonate on the membrane while achieving a concentration sufficient for saturation at the temperature in the crystallizer. The permeate 62 is a clean water than can be reused or discharged.

The concentrated effluent 64 out of the reverse osmosis filter 60 is then treated at a temperature of less than about 20 degrees Celsius in stage three using a crystallizer 70. Solid crystals of ammonium bicarbonate are grown in the crystallizer 70 under controlled conditions, separated from the liquid fraction to produce an ammonium-salt 74 which may be dried, pelletized or granulated to form a final product. In some embodiments, a portion of the saturated ammonium bicarbonate supernatant is recycled 72 to the reverse osmosis filter 60, after it is heated to the required temperature in heat exchanger 56.

Due to the unique sequence of the preceding unit operations, the resulting ammonium salt may be dried and packaged for commercial distribution as a specialized nitrogen fertilizer, that is high-purity, phosphorus free, and certified USDA organic. The ammonia recovery step is the equivalent of distillation. This allows nearly no salt (including phosphorus salts) carry over to the input to reverse osmosis. Crystallization is another purification step, so that "high-purity, phosphorus free" product is achieved. If synthetic chemicals are not used in obtaining the solid AB or liquid digestate, the ammonium bicarbonate product will have the potential for designation as organic (USDA 2012) fertilizer. The USDA designation is of economic importance as the price of organic fertilizer expressed as dollars per pound ammonia nitrogen, is materially higher than that of chemical (non-organic) fertilizers that are equally uniform, high purity, and concentrated sources of NH3-N. As with synthetic fertilizer, the material is nearly odorless, and has low transport and application costs relative to manure and digestate. If the ammonia is captured with an industrial acid or is derived from application of caustic or other industrial alkali—it will not qualify as organic fertilizer. The ammonium salt according to the invention resolves this conflict by (1) producing ammonia gas thermally with no chemical addition, and (2) using the carbon dioxide found in the digestate to recover the ammonia from the digestate to form an organic fertilizer, ammonium bicarbonate.

The ammonium salt 74 can be stored 80 for use on or off site.

FIG. 5 is a process flow schematic drawing of a variation on the embodiment of the invention shown in FIG. 1 for the treatment of livestock manure (e.g., from a Controlled Animal Feeding Operation, CAFO) comprising solids separation, physical influent conditioning, anaerobic digestion, stripping, condensation (concentration), absorption, and crystallization. In the FIG. 5 process, there is no chemical addition to adjust pH prior to, or in, the stripping process. The present invention excludes the use of pH adjustment chemicals. In the process according to FIG. 5, there is also no external supply of carbon dioxide. The carbon dioxide, which derives directly from the livestock manure waste, is supplemented by carbon dioxide from the biogas to assure maintenance of CO2 in the water to stabilize the ammonia in the absorber column. FIG. 5 shows the biogas 32 processed in a CO2 removal device 35 to provide CO2 to for capture of ammonia as ammonium bicarbonate. For example, the device could be a pressure swing adsorption device which is commonly used to separate gases, such as CH4 and CO2, with materially different properties. In FIG. 5, footnotes 1-4 denote the following:

[1]—vapor is constant composition for continuous operation and varies during a batch process. H2O, CO2, and NH3 evolve with traces of organic volatiles and semi-volatiles.

[2]—pressure control valve(s) is set to maintain differentials between a) the stripper unit and the condenser, and b) the condenser and the absorber. Absorber temperature, T, must be less than 50 C to keep NH4 and HCO3 in solution, while stripper temperature must be greater than 80 C to convert to NH3 and CO2.

[3]—AB solution in absorber is formed from Digester biogas

[4]—AB concentrate is supersaturated relative to temperature of crystallizer.

As depicted in FIG. 5, raw livestock manure 10 is transported to a solids separation and physical conditioning unit/process 20 (it being understood that a mixing or holding tank/vessel could be used prior to solids separation and/or can be used for solids separation). The solids separation unit/process may be a single stage or chamber unit or it could be a series of stages or chambers for coarse solids separation, intermediate solids separation, and physical mixing and conditioning. Physical conditioning may include dilution, grinding, mixing, heating etc., depending on the specific livestock manure processed; dilution may be necessary for some manure to provide the appropriate consistency and concentration for the AD, grinding and mixing may be needed to help solubilize and make more available the organic content for digestion, heating may be needed for the anaerobic digester influent but may also be used to sterilize and prevent biological competition during digestion.

The slurry/effluent 24 from the solids separation unit 20 is input into an anaerobic digester 30 which digests much, preferably most, of the dissolved organics and small organic particulates to produce biogas 32 and an effluent digestate 34.

The effluent digestate 34 from the anaerobic digester 30 contains residual solids, dissolved salts and organics, and concentrations of dissolved ammonia and carbon dioxide.

The present invention collects the ammonia and carbon dioxide and captures them in a subsequent multistage process to form solid ammonium bicarbonate. Each stage of the subsequent multistage process operates at different temperatures to take advantage of the solubility properties of ammonium bicarbonate for its concentration in dissolved form and then its formation as a nitrogen rich solid.

The temperature of digestate 34 out of a typical anaerobic digester treating livestock manure is about 35 degrees Celsius. For the process of the invention, the digestate needs to be heated to greater than about 80 degrees Celsius for treatment in the stripper 40.

The stripper operating at a temperature of greater than about 80 degrees Celsius, without any chemical addition to increase pH, creates exhaust vapor 42 containing water vapor, gaseous carbon dioxide, and gaseous ammonia. Vapor 42 will also contain traces of organic volatiles and semi-volatiles. The treated water and solids 44 out of the stripper can be further treated for application to land or water using current treatment technologies. The water vapor 42 created by stripping the digestate 34 in that first stage, the separation stage, is then condensed in the condenser. The condenser is operated as a single or multistage unit to condense the water vapor at a high temperature, to separate water from the gaseous ammonia and CO2 effectively concentrating them in the gas. The amount of ammonium carbonate and ammonium bicarbonate concentration in the concentrated gas is at least 2 times greater than in the gas before treatment with condensation and could be as high as 100 times to 1000 times higher. The high temperature condensed water 55 is removed from the condenser and may be channeled back to the stripper to reclaim any re-dissolved ammonia and carbon dioxide, may be discharged from the process, may be used as seed liquid in the absorber, or may be recycled to combine with the fresh livestock manure entering the digester.

Absorber 50 is used to treat vapor 142 at a temperature of between about 20 degrees Celsius and 50 degrees Celsius. Pressure control valves 48 can be used between the stripper 40, the condenser, and the absorber 50 to maintain proper differential pressure between the unit processes. Operating the absorber 50 between about 20 and 50 degrees Celsius allows the water vapor, ammonia, and carbon dioxide to form dissolved ammonium bicarbonate. Maintaining between about 20 and 50 degrees Celsius in the absorber 50, and a pH less than 9, prevents precipitation of dissolved ammonium bicarbonate or ammonium carbonate and keeps it in dissolved form. Temperature of the absorber 50 can be controlled with a heat exchanger 56 and by regulating the temperature of the carbon dioxide. Since a majority of the water is condensed and removed from the vapor phase prior to the absorber, the amount of water used to generate the concentrated AB solution is minimized and controlled. The ammonia and carbon dioxide gasses continue to absorb and form an AB solution in the controlled volume of water until they reach close to saturation at the selected temperature between 20 and 50 degrees Celsius.

The concentrated effluent 64 out of the absorber is then treated at a temperature of less than about 20 degrees Celsius in stage four using a crystallizer 70. Solid crystals of ammonium bicarbonate are grown in the crystallizer 70 under controlled conditions, separated from the liquid fraction to produce an ammonium-salt 74 which may be dried, pelletized or granulated to form a final product. The more dilute AB solution, following this crystallization process, is returned to the absorber as seed liquid to dissolve more ammonia and carbon dioxide as AB under the higher temperature conditions, between 20 and 50 degrees Celsius.

The embodiment of the invention shown in FIG. 5 may increase the overall efficiency by potentially eliminating the need for any other concentrating unit process, specifically the RO, instead performing the concentration through removal of water vapor. Substantial reductions in capital cost, energy costs, operating costs, and maintenance costs could all be realized with that embodiment of the invention. The potential for product losses may also be reduced by eliminating or reducing the reverse osmosis, especially since reverse osmosis operates at relatively high pressures. A safer process may also created by eliminating or reducing the high pressure reverse osmosis, it being understood that the present invention also includes variations with the addition of a reverse osmosis step.

The embodiment of the invention shown in FIG. 5 may eliminate the need for any other concentrating unit process, specifically the RO, instead performing the concentration through removal of water vapor in the partial condenser and capturing the dissolved AB in the absorber. Substantial reductions in capital cost, energy costs, operating costs, and maintenance costs may be realized with that embodiment of the invention. While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of applicants' invention.

We claim:

1. A process to treat waste containing ammonia nitrogen comprising:
    treating waste at a temperature of at least 80 degrees Celsius to create a gas and, without the addition of chemicals that are not inherently present in the waste, converting substantially all ammonia in the waste to gaseous form in the gas, said gas also containing carbon dioxide and water vapor;
    treating said gas containing gaseous ammonia, carbon dioxide and water vapor, using partial condensation, or repeated partial condensation, to concentrate the ammonia and carbon dioxide; all without the use of chemical(s) that are not inherently present in the waste, and remove from said gas a significant amount of water vapor in liquid condensate form, causing formation of a concentrated gas containing higher concentrations of ammonia gas and carbon dioxide gas than before condensation;
    treating said concentrated gas using absorption or adsorption to form concentrated ammonium carbonate and ammonium bicarbonate;
    crystallizing the concentrated ammonium carbonate and ammonium bicarbonate at a temperature of less than about 35 degrees Celsius to form solid ammonium bicarbonate and ammonium carbonate.

2. The process according to claim 1, wherein said treating waste at a temperature of at least 80 degrees Celsius comprises stripping the waste of ammonia.

3. The process according to claim 1, wherein said treating waste at a temperature of at least 80 degrees Celsius comprises stripping the waste using biogas from an anaerobic digester used to treat the waste prior to stripping.

4. The process according to claim 1, wherein said treating waste at a temperature of at least 80 degrees Celsius comprises drying the waste using a dryer and removing ammonia with the water vapor in gaseous form.

5. The process according to claim 1, wherein said treating waste at a temperature of at least 80 degrees Celsius comprises separation of the ammonia and other gases using membrane modules.

6. The process according to claim 1, wherein substantially all the gaseous ammonia in the gas is converted into ammonium carbonate and ammonium bicarbonate using the carbon dioxide in the gas without the addition of carbon dioxide not present in the digestate.

7. The process according to claim 6, wherein the waste is a digested manure.

8. The process according to claim 1, wherein substantially all the gaseous ammonia in the gas is converted into ammonium carbonate and ammonium bicarbonate using the carbon dioxide in the gas with the addition of carbon dioxide from another source.

9. The process according to claim 1, wherein said condensation is a two-stage condensation process comprising sequential condensation at two temperatures or residence times.

10. The process according to claim 9, wherein said total ammonia and carbon dioxide concentration in the concentrated gas is at least 2 times greater than in the gas before treatment with condensation.

11. The process according to claim 1, wherein said concentrated ammonium carbonate and ammonium bicarbonate after absorption or adsorption comprises at least about 5 times the concentration of dissolved ammonium bicarbonate in the digestate.

12. The process according to claim 1, wherein solid crystals of ammonium bicarbonate grown in the crystallizer are produced creating a solid ammonium-salt.

13. The process according to claim 12, wherein the ammonium-salt is dried, pelletized or granulated.

14. The process according to claim 1, wherein the waste is industrial wastewater.

15. The process according to claim 1, wherein the waste is municipal wastewater.

16. A process to treat waste containing ammonia nitrogen comprising:
    treating waste using anaerobic digestion creating a biogas and a digestate;
    treating said biogas to separate and concentrate carbon dioxide in said biogas from other gases in said biogas forming a concentrated carbon dioxide biogas;
    treating said digestate at a temperature of at least 80 degrees Celsius to create a gas and, without the addition of chemicals that are not inherently present in the waste, converting substantially all ammonia in the waste to gaseous form in the gas, said gas also containing carbon dioxide and water vapor;
    treating said gas from digestion containing gaseous ammonia, carbon dioxide, and water vapor, using partial condensation, or repeated partial condensation, operating at a temperature of at least 80 degrees Celsius, without the use of chemicals that are not inherently present in the waste, to remove from said gas a significant amount of water vapor and organics in liquid condensate form, causing formation of a condenser effluent concentrated gas containing higher concentrations of ammonia gas and carbon dioxide gas than before condensation;
    treating said concentrated carbon dioxide biogas and said condenser effluent concentrated gas using absorption or adsorption operating at a temperature of between about 20 and 50 degrees Celsius to form concentrated ammonium carbonate and ammonium bicarbonate;
    crystallizing the concentrated ammonium carbonate and ammonium bicarbonate at a temperature of less than about 35 degrees Celsius to form solid ammonium bicarbonate and ammonium carbonate.

17. The process according to claim 16, further comprising recycling a portion of said concentrated ammonium carbonate and ammonium bicarbonate from said crystallization to assist with said absorption or adsorption.

18. The process according to claim 17, wherein substantially all the ammonia in the gas from digestion is converted into ammonium carbonate and ammonium bicarbonate using the carbon dioxide in the waste without the addition of carbon dioxide from another source.

19. The process according to claim 18, wherein said treating waste at a temperature of at least 80 degrees Celsius comprises stripping the waste of ammonia.

20. The process according to claim 16, wherein said treating waste at a temperature of at least 80 degrees Celsius comprises stripping the waste using biogas from an anaerobic digester used to treat the waste prior to stripping.

21. The process according to claim 16, wherein said treating waste at a temperature of at least 80 degrees Celsius comprises drying the waste using a dryer and removing ammonia with the water vapor in gaseous form.

22. The process according to claim 16, wherein solid crystals of ammonium bicarbonate grown in the crystallizer are produced creating a solid ammonium-salt.

23. The process according to claim 16, wherein the ammonium-salt is dried, pelletized or granulated.

24. The process according to claim 16, wherein the waste is industrial wastewater.

25. The process according to claim 16, wherein the waste is municipal wastewater.

* * * * *